US010081227B1

(12) United States Patent
Mao (10) Patent No.: US 10,081,227 B1
(45) Date of Patent: Sep. 25, 2018

(54) RETRACTABLE VEHICLE SUN SHADE WITH A MAGNETIC LATCH

(71) Applicant: Yuen Hui Mao, San Diego, CA (US)

(72) Inventor: Yuen Hui Mao, San Diego, CA (US)

( * ) Notice: Subject to any disclaimer, the term of this patent is extended or adjusted under 35 U.S.C. 154(b) by 0 days.

(21) Appl. No.: 15/698,229

(22) Filed: Sep. 7, 2017

Related U.S. Application Data (60) Provisional application No. 62/474,609, filed on Mar. 22, 2017.

(51) Int. Cl.
*B60J 3/00* (2006.01)
*B60J 1/20* (2006.01)

(52) U.S. Cl.
CPC ............ *B60J 1/2047* (2013.01); *B60J 1/203* (2013.01); *B60J 1/2041* (2013.01); *B60J 1/2063* (2013.01); *B60J 1/2077* (2013.01)

(58) Field of Classification Search
CPC ........ B60J 1/203; B60J 1/2038; B60J 1/2041; B60J 1/2047; B60J 1/2063; B60J 1/2077
USPC ............................ 160/370.22; 296/97.9, 97.7
See application file for complete search history.

(56) References Cited

U.S. PATENT DOCUMENTS

| | | | |
|---|---|---|---|
| 3,183,033 A * | 5/1965 | Stulbach | B60J 1/2063 |
| | | | 160/120 |
| 4,373,569 A * | 2/1983 | Barettella | E06B 9/44 |
| | | | 160/263 |
| 4,802,751 A * | 2/1989 | Ueng | B60R 1/081 |
| | | | 248/484 |
| 5,016,937 A * | 5/1991 | White | B60J 11/08 |
| | | | 160/370.21 |
| 5,044,686 A * | 9/1991 | Acenbrack | B60J 1/2091 |
| | | | 160/32 |
| 5,845,956 A * | 12/1998 | Yang | B60J 1/2063 |
| | | | 296/97.8 |
| 6,131,643 A * | 10/2000 | Cheng | B60J 11/02 |
| | | | 160/24 |
| 7,114,759 B1 * | 10/2006 | Chen | B60J 1/2091 |
| | | | 296/97.2 |
| 7,143,805 B1 | 12/2006 | Weir | |
| 2010/0013262 A1 | 1/2010 | Shu | |

FOREIGN PATENT DOCUMENTS

| CN | 203318123 | 12/2013 |
|---|---|---|
| CN | 203766449 | 8/2014 |

* cited by examiner

*Primary Examiner* — Katherine W Mitchell
*Assistant Examiner* — Abe Massad
(74) *Attorney, Agent, or Firm* — Coastal Patent Law Group, P.C.

(57) ABSTRACT

A retractable sun shade for a vehicle that rolls up into a housing at the base of the windshield. Magnets on the top edge of the shade latch with corresponding magnets mounted to the vehicle to hold the shade open when deployed. Vehicle magnets may for example be on a T-bar that is clamped to the rearview mirror arm. The housing may be held in position via tension bars on the left and right ends of the housing, which push outward against the sides of the vehicle to hold the housing in place. The system may be installed or removed without tools, adhesives, or fixtures. The system conforms to vehicles and windshields of different sizes and shapes. Deployment and retraction of the shade are rapid and simple.

12 Claims, 6 Drawing Sheets

RETRACTABLE VEHICLE SUN SHADE WITH A MAGNETIC LATCH

This application claims the benefit of U.S. Provisional Patent Application 62/474,609, filed 22 Mar. 2017, the specification of which is hereby incorporated herein by reference.

BACKGROUND OF THE INVENTION

Field of the Invention

One or more embodiments of the invention are related to the field of sunshades for a vehicle, which may for example be placed on the front windshield to block sunlight when the vehicle is parked. More particularly, but not by way of limitation, one or more embodiments of the invention enable a retractable vehicle sunshade with a magnetic latch.

Description of the Related Art

Various types of sunshades for vehicles are known in the art. These sunshades may have panels or screens that are manually placed across a windshield when a vehicle is parked, and then manually folded up and removed from the windshield to use the vehicle. The manually placing and removal of these sunshades may be time-consuming and inconvenient. Moreover, the folded-up sunshades must be stored away from the windshield (for example in a trunk), and then retrieved each time for subsequent use.

Some retractable sunshade systems are known in the art; these systems incorporate a housing for a screen that remains in position, for example at the base of the windshield, when the sunshade is retracted. Illustrative systems are taught for example in Weir, U.S. Pat. No. 7,143,805 titled "Sunscreen," and in Shu, United States Patent Application Publication US 2010/0013262 A1 titled "Sunshade for Motor Vehicles." These publications teach retractable sunshades. However, in both of these systems, fixtures must be mounted on the vehicles using for example glue or other semi-permanent attachments. The system taught in Shu envisions placing the shade over several hooks for deployment, and unhooking the shade for retraction. The system taught in Weir further envisions two different shades for the driver's side and passenger's side of a windshield. Neither of these systems may be installed or removed easily without glue or similar adhesives. Neither provides an extremely rapid and simple method of deployment or retraction.

For at least the limitations described above there is a need for a retractable vehicle sun shade with a magnetic latch.

BRIEF SUMMARY OF THE INVENTION

One or more embodiments described in the specification are related to a retractable vehicle sun shade with a magnetic latch. One or more embodiments may include a shade, which may be made for example of a flexible material that partially or fully blocks sunlight, a housing into which the shade is retracted for storage, and a latching mechanism to hold the shade open when deployed. The shade may be installed for example on the windshield of a vehicle to block sunlight when the vehicle is parked or stored.

In one or more embodiments the housing may extend horizontally along the base of a window such as the windshield. The shade may be rolled up in the housing when it is in a retracted position. The housing may have a spring or similar bias mechanism to automatically retract the shade into the housing. To deploy the shade, a user may for example pull vertically upward on the top edge of the shade. One or more embodiments may incorporate a magnetic latch that holds the shade in the deployed position. For example, one or more magnets may be installed in or mounted to the vehicle, and may latch via magnetic attraction with one or more corresponding magnets on the top edge of the shade to hold the shade in the deployed position.

In one or more embodiments, the shade may have an indentation along the top edge into which the rearview mirror arm of the vehicle may fit when the shade is deployed.

To hold the housing in place in the vehicle, one or more embodiments may incorporate tension bars attached to the left and right ends of the housing. These tension bars may for example employ springs or other bias mechanisms to push outwards and contact the vehicle, thereby holding the housing in position. The tips of the left and right tension bars may be made of rubber, for example, or of another compliant material. One or more embodiments may employ other mechanisms to hold the housing in position, such as for example, without limitation, suction cups that attach to the windshield, or other mounting fixtures.

Magnets mounted to the vehicle, which mate with magnets on the top edge of the shade, may be secured to the vehicle using any desired mount or fixtures. For example, in one or more embodiments a vehicle magnet mount may be a T-bar clamped to the rearview mirror arm. This mount may for example have a clamp, a vertical post extending upwards from the clamp, and a horizontal bar attached to the post that holds the vehicle magnet or magnets.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

A retractable vehicle sun shade with a magnetic latch will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
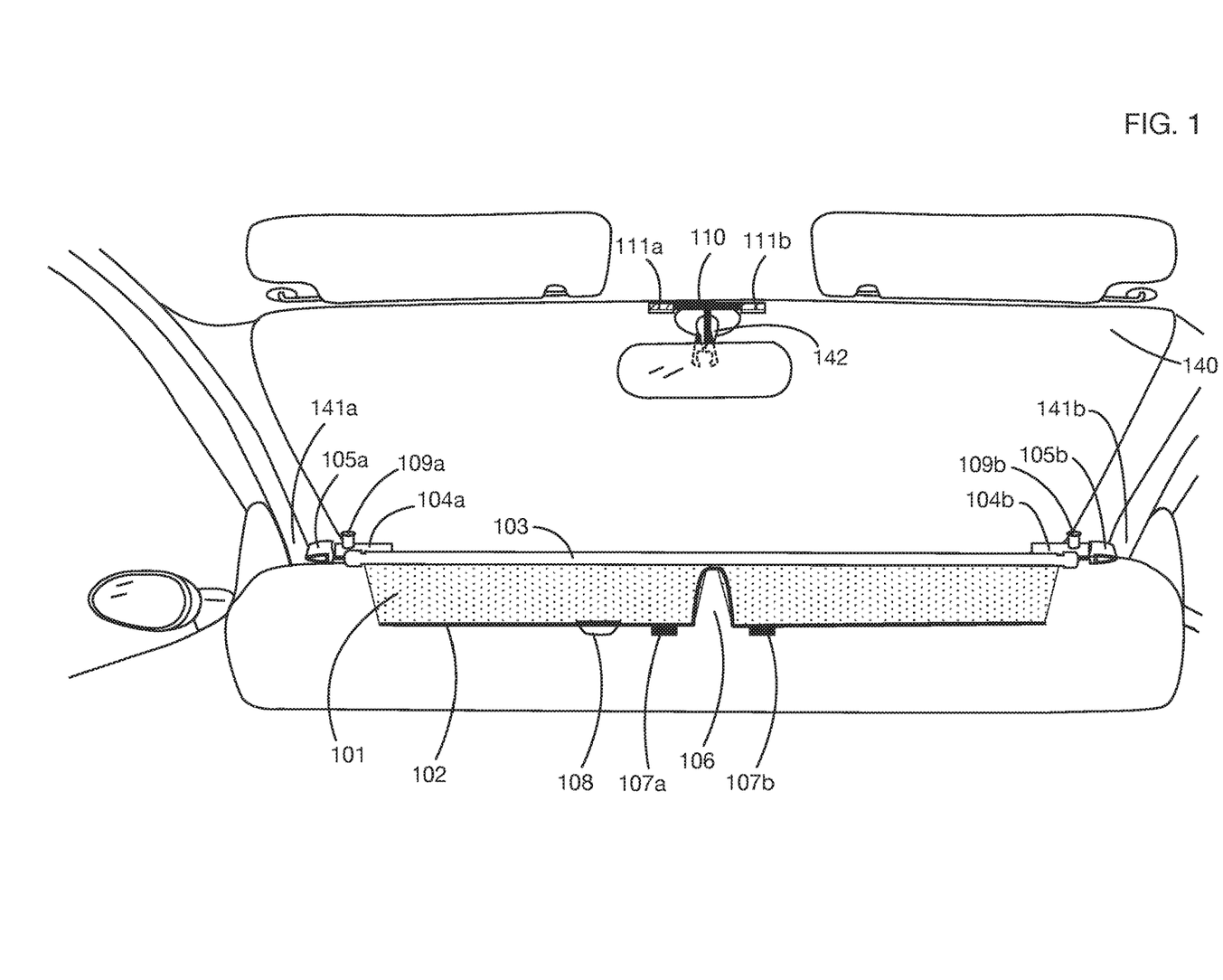
FIG. 1 shows an embodiment of a retractable sun shade with a magnetic latch, shown installed into a vehicle at the front windshield; the sun shade is shown in the retracted position.
Figure 2:
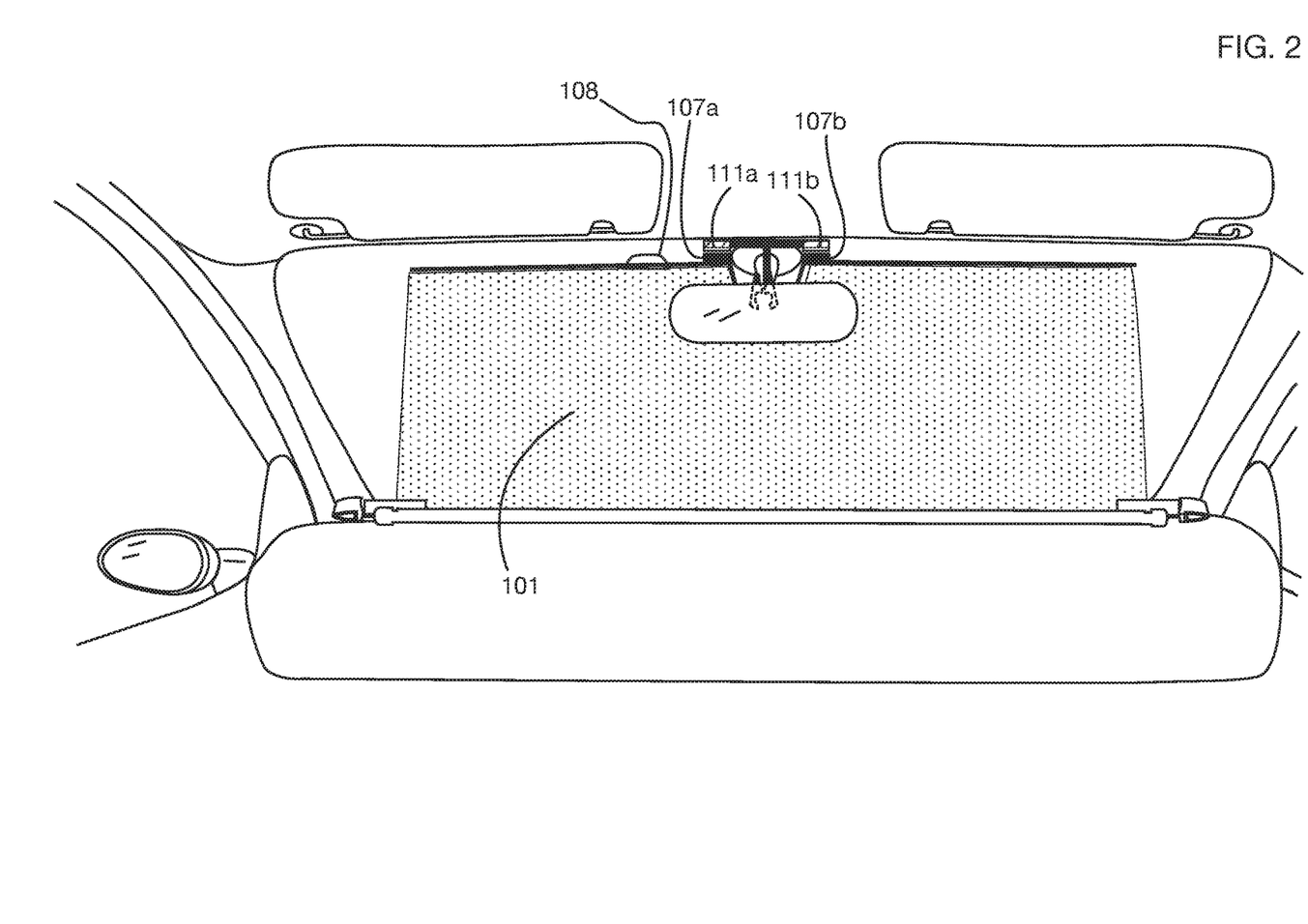
FIG. 2 shows the sun shade of FIG. 1 in the deployed position, with the magnetic latch holding the top of the sun shade to corresponding magnets on a T-bar clamped to the rearview mirror arm.

FIG. 1 shows an embodiment of a retractable sun shade with a magnetic latch, installed into a vehicle to provide a shade for windshield 140. In FIG. 1 the sun shade 101 is shown in the retracted position, with most of the shade contained in housing 103. (FIG. 2 shows the sun shade in the deployed position, where it blocks some or all of the sunlight entering through the windshield.) Housing 103 is installed into the vehicle at the bottom of windshield 140. In one or more embodiments, a housing may be installed in any location or orientation in a vehicle, along any window or windows or other openings; for example, the housing may be installed along the top of a window and the shade may be deployed by extending it downwards. In this illustrative embodiment, the shade retracts into housing 103 by rolling up into the housing. Housing 103 may for example contain a torsion spring or another mechanism to cause the shade to roll up and retract into the housing automatically when the latch holding the shade open is released. Housing 103 may be for example roughly cylindrical in shape in one or more embodiments, with a horizontal slot through which the shade is deployed or retracted for storage.

Shade 101 may for example be made of a flexible material, which may allow the shade to roll up inside the housing 103 for storage when retracted. The shade material or materials may be opaque or semi-transparent, and may block any or all of the sunlight that hits the shade. The shade may be made of any size, shape, color, pattern, material, thickness, transparency, or polarization. Illustrative materials for the shade may include for example, without limitation, polyvinyl chloride, canvas, nylon, and cotton. In one or more embodiments, the shade may be made of multiple sheets, and different sheets may have different materials, transparency, polarization, colors, thickness, shapes, sizes, or patterns.

Housing 103 may be held in position relative to the vehicle or vehicle windshield with any type of mechanism or fixture. For example, without limitation, the housing may be glued, taped, screwed, bolted, strapped, or wedged into or onto any portion of the vehicle or windshield. In one or more embodiments, one or more suction cups may be attached to housing 103 to attach the housing to the windshield. One or more embodiments may include mounting fixtures to facilitate attachment of the housing to the vehicle. In the illustrative embodiment shown in FIG. 1, housing 103 is held in position using tension bars 104a and 104b, which are attached to the left end and right end, respectively, of housing 103. These tension bars may for example have a spring or other bias mechanism that push the tips of the tension bars outward to contact the vehicle, thereby holding the housing in place. For example, in FIG. 1, left tension bar 104a is attached to the left side of housing 103, and tip 105a of tension bar 104a presses against side 141a of the vehicle interior when the system is installed. Similarly, right tension bar 104b is attached to the right side of housing 103, and tip 105b of tension bar 104b presses against side 141b of the vehicle interior when the system is installed. The contacts between tip 105a and vehicle surface 141a and between tip 105b and vehicle surface 141b hold the housing in position. Tips 105a and 105b may for example be made of a compliant material such as rubber, and of a material that grips securely against the vehicle surface. In one or more embodiments, the tension bars 104a and 104b may have protrusions such as knobs 109a and 109b, which may be held by a user so that the user can pull the tension bars inward to fit the width of windshield 140. One or more embodiments may have any type of attachment or mechanism attached to or integrated into one or both tension bars to facilitate holding, pulling, or adjusting the tension bars. A potential benefit of a tension bar mechanism is that no modifications or additions may be required to the vehicle (such as glue or tape); hence the sun shade system can be easily installed and removed with minimal effort and with no tools or additional materials. Tension bars also automatically conform to vehicle widths of different sizes. One or more embodiments may use multiple mechanisms to hold housing 103 in position.

In the embodiment shown in FIG. 1, the top edge 102 of shade 101 may be pulled upward towards the top of windshield 140 to deploy the sun shade. (Note that in the perspective view of FIG. 1, the top of edge 102 of the shade appears to be below the housing, because the shade 101 is shown lying flat against the dash in a partially deployed position, with the majority of the shade rolled up in the housing 103.) The top edge 102 of the shade may for example be attached to a metal bar or another component to facilitate holding, pulling, and securing the shade. An indentation or gap 106 appears in the center of the top edge of the shade, which allows the shade to be deployed around the rearview mirror arm 142. One or more embodiments may include any indentations or other features of the shade to allow the shade to fit around any components installed in the vehicle. Grab handle 108 is attached to top edge 102; a user may use this handle to pull the shade upwards for deployment, and to pull the shade down to release the latch for retraction. One or more embodiments may have multiple grab handles or other features to facilitate holding, deploying, or retracting the shade. In one or more embodiments, the grab handle 108, the top edge 102, or any other components of the system may be covered with rubber or with other materials that may prevent these components from becoming hot (for example when they are exposed to sunlight through the windshield), so that a user can comfortably install, adjust, deploy, and retract the system.

Because the housing 103 may include a spring or similar bias mechanism to automatically retract the shade, some type of latch may be needed or desired to hold the shade in the deployed position. In the embodiment shown in FIG. 1, the latch is magnetic. One or more embodiments may use other types of latches or securing mechanism to hold the shade in the deployed position. Magnets 107a and 107b are attached along the top edge 102 of the shade 101. These magnets mate with corresponding vehicle magnets 111a and 111b located near the top of the windshield to latch the shade in the deployed position. Use of two magnets is illustrative; one or more embodiments may use any number of magnets to latch the shade in the deployed position. Magnets may be located in any positions along the top edge of the shade or elsewhere. Instead of or in addition to magnets, one or more embodiments may use hooks, clips, snaps, Velcro®, or any other latching mechanisms.

Vehicle magnets 111a and 111b may be held in position using any desired mounts, fixtures, or mechanisms. For example, these magnets may be attached directly to the windshield 140, to the roof of the vehicle, or to sun visors of the vehicle. In the embodiment of FIG. 1, vehicle magnets 111a and 111b are attached to a mount 110 that clamps onto the arm 142 holding the rearview mirror to the windshield. The clamp (shown in dotted lines in FIG. 1 because it is behind the rearview mirror) may for example have a spring, a screw, or a similar clamping mechanism that holds it securely on the arm 142. A vertical post may protrude from the clamp, onto which a horizontal bar may be placed to hold magnets 111a and 111b. A potential benefit of this clamping mount 110 is that it can be installed or removed easily, without tools or tape or glue.

Figure 3:
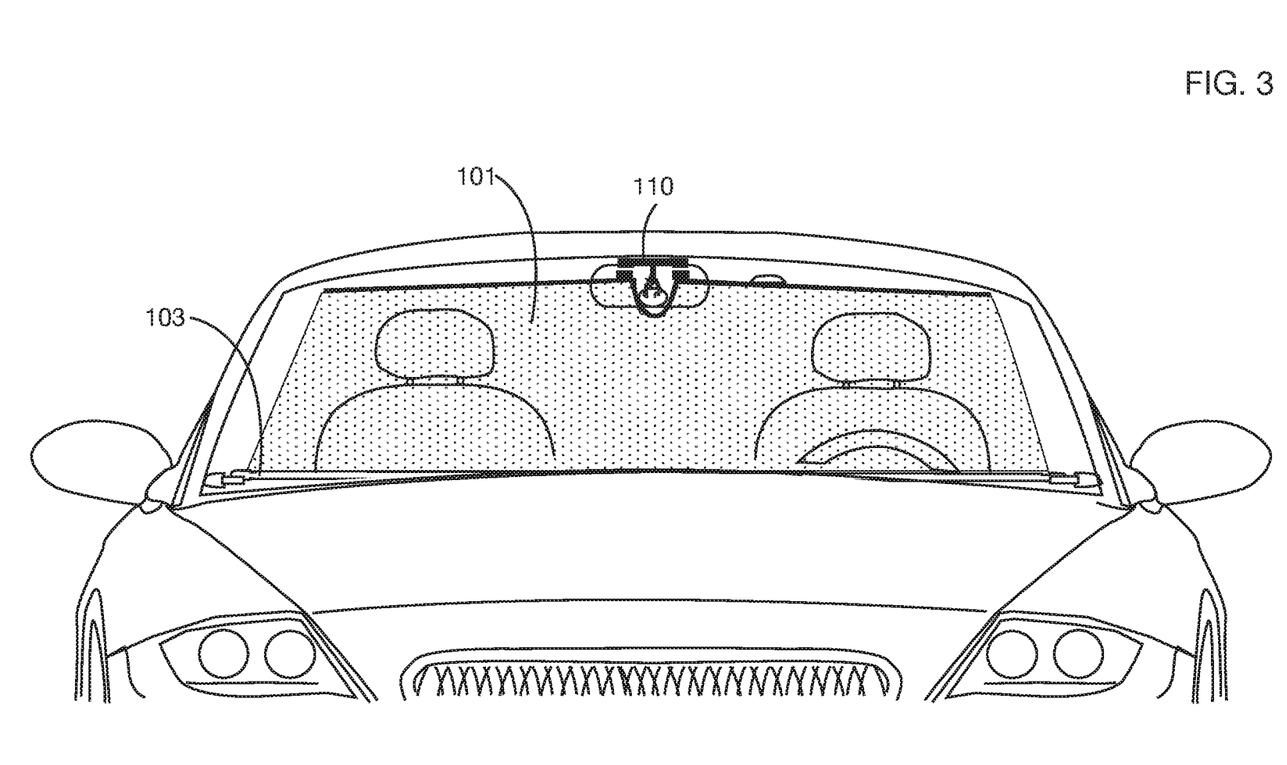
FIG. 3 shows a view of the sun shade of FIG. 2 as seen from the front of the vehicle through the windshield.

FIG. 2 shows the sun shade of FIG. 1 in the deployed position. A user pulls for example on the grab handle 108 to raise the shade 101 vertically until magnets 107a and 107b latch with vehicle magnets 111a and 111b. The magnetic attraction between magnets 107a and 111a, and between magnets 107b and 111b, holds the shade in the deployed position. The arm of the rearview mirror fits in the gap formed by the indentation in the top edge of the shade. The user may pull the grab handle 108 downwards to release the latch for storage of the shade. FIG. 3 shows a front view of the shade 101 in the deployed position, viewed from the front of the vehicle through the windshield. Although the shade shown in FIG. 3 is semi-transparent, in one or more embodiments the shade may be of any degree of transparency, including completely opaque. The deployed shade 101 may be of any desired shape, including for example, without limitation, rectangular, trapezoidal, or curved. In one or more embodiments, the top edge of shade 101 may be slightly narrower than the bottom edge, for example (without limitation) by approximately 1 inch on each side.

Figures 4A, 4B, 4C:
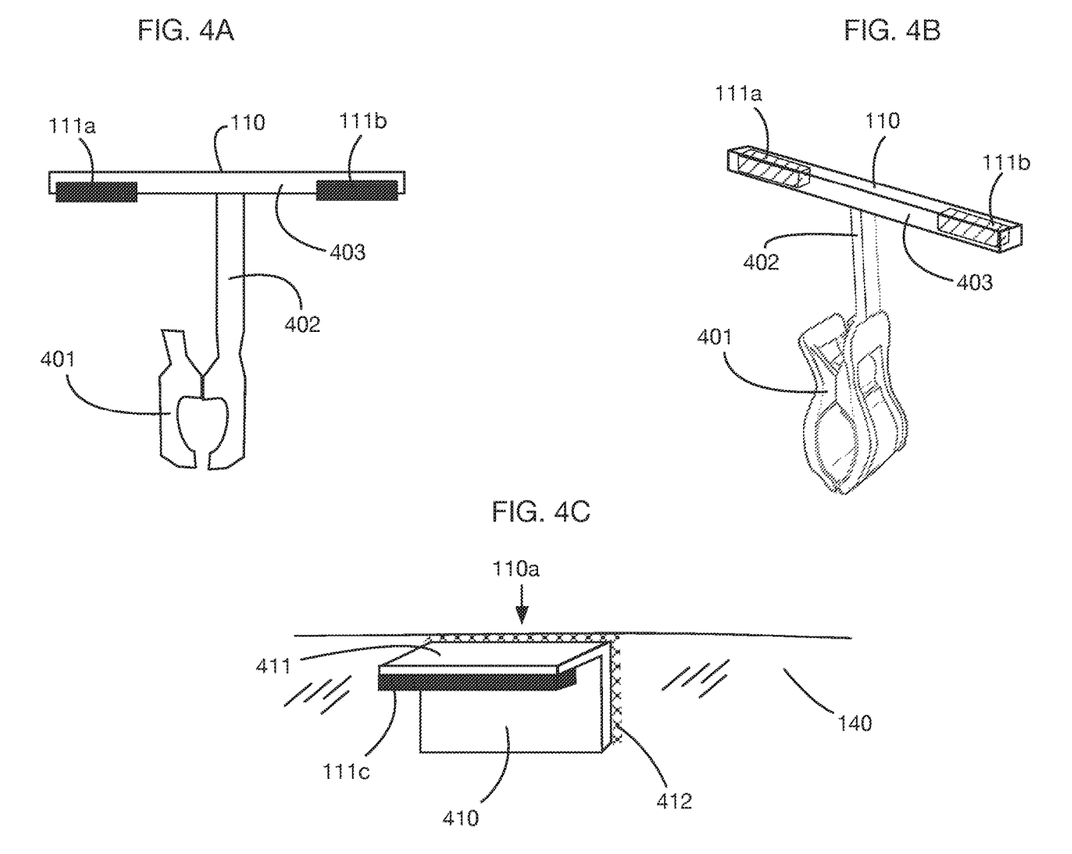
FIGS. 4A and 4B show side and perspective views, respectively, of the vehicle magnet mount of FIG. 1 that is clamped to the rearview mirror arm.
FIG. 4C shows an alternative magnet mount that may be attached to a windshield instead of clamped to the rearview mirror arm.

FIGS. 4A and 4B show side and perspective views, respectively, of an embodiment of the vehicle magnet mount 110. Clamp 401 is configured to fit around the arm of a rearview mirror and to hold the mount securely on this arm. The clamp may for example include a spring or a similar mechanism to hold the jaws of the clamp against the mirror arm. Vertical post 402, which may for example be integrated with or attached to part of clamp 401, extends vertically upward and connects to horizontal bar 403 that holds magnets 111a and 111b. Magnets 111a and 111b may be for example attached to or integrated into horizontal bar 403. In one or more embodiments, the entire horizontal bar 403 may be a magnet or a ferrous material.

FIG. 4C shows an illustrative vehicle magnet mount 110a that may be attached directly to the windshield, instead of being clamped around the rearview mirror arm. This mount 110a may for example have an L-shaped element, with a vertical portion 410 that attaches to the windshield, and a protruding upper horizontal portion 411 to which magnet 111c is attached. Magnet 111c may for example mate with either or both of magnets 107a and 107b from FIG. 1, which are attached to the shade. L-shaped elements 410 and 411 may be made of a transparent material, such as acrylic for example. The vertical face 410 may be attached to the windshield for example using double-sided clear adhesive tape 412, or using any other fastener or adhesive. In one or more embodiments, there may be multiple magnet mounts 110a attached to the windshield. The L-shaped configuration of the mount shown in FIG. 4C is illustrative; one or more embodiments may use one or more magnet mounts of any shape and size, which may be attached to any portion or portions of the windshield or to any other portion or portions of the vehicle.

Figure 5A:
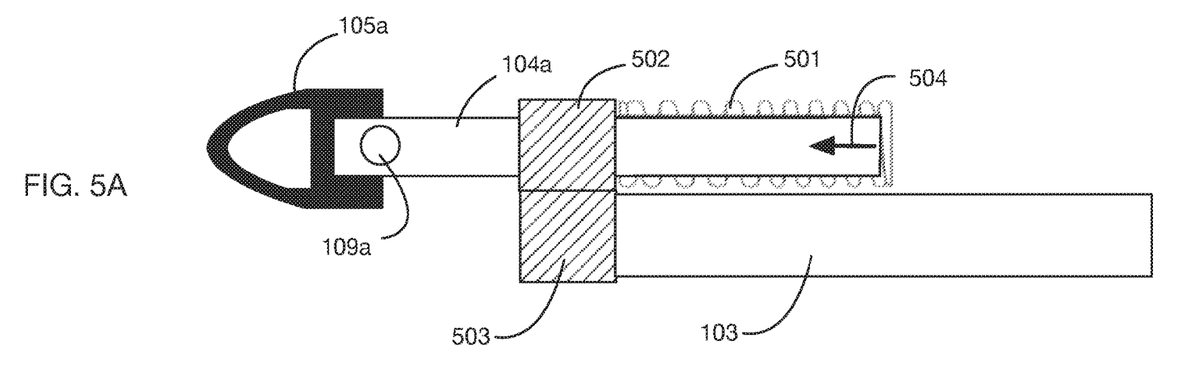
FIGS. 5A and 5B show side and perspective views, respectively, of an embodiment of a tension bar that holds the housing of a sun shade in position in the vehicle.
Figure 5B:
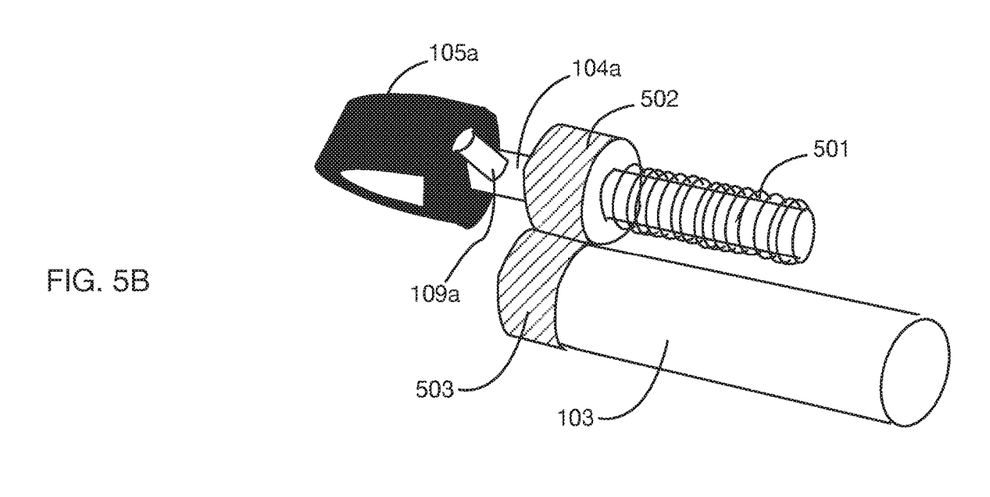

FIGS. 5A and 5B show side and perspective views, respectively, of an embodiment of a left side tension bar that holds housing 103 in position in the vehicle. (A right side tension bar may be configured similarly.) In this illustrative embodiment, tension bar 104a fits through a hole in annular element 502, which is attached to a corresponding end 503 of housing 103. Spring 501 is attached to this element 502, and it pushes tension bar 104a leftward with force 504. Tip 105a, which may for example be made of rubber or a similar material, may compress when it contacts the side of the vehicle. In the embodiment shown in FIGS. 5A and 5B, the center of tip 105a is hollow to facilitate compression of the tip. Because tension bar 104a slides freely in element 502, it can expand or contract to accommodate different vehicle widths. Knob 109a may be attached to or integrated into tension bar 104a to allow a user to grip the tension bar and pull it inwards to adjust the fit for the width of the vehicle.

Figure 5C:
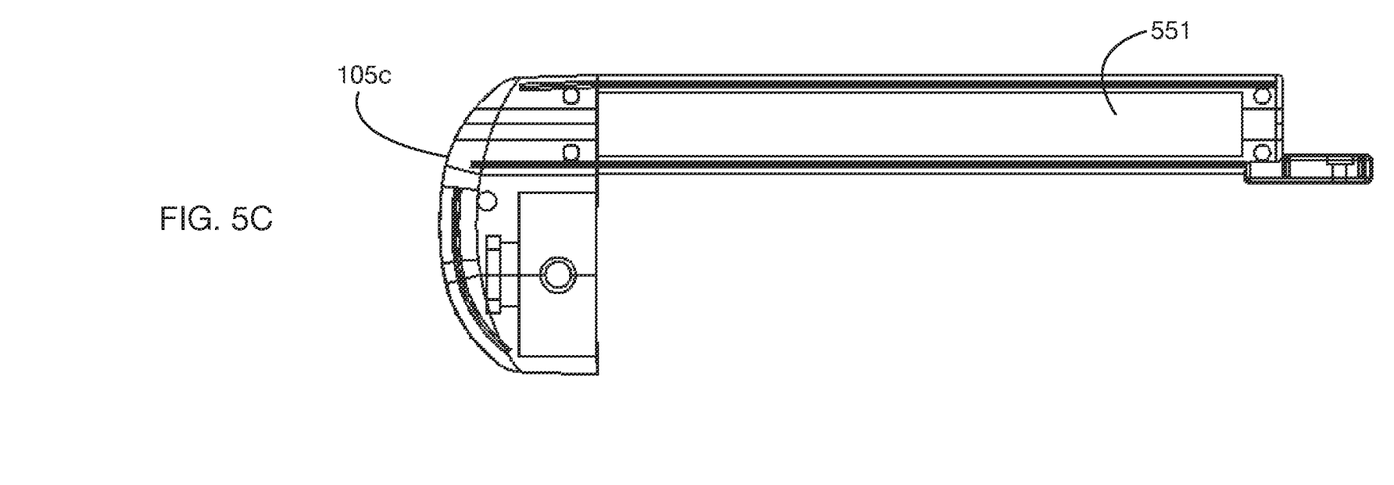
FIG. 5C shows a side view of another embodiment of a tension bar that holds the housing of a sun shade in position in the vehicle.

FIG. 5C shows another embodiment of a left side tension bar that holds housing 103 in position in the vehicle. (A right side tension bar may be configured similarly.) In this illustrative embodiment, tip 105c, which may for example be made of rubber or a similar material, may compress when it contacts the side of the vehicle. A spring (such as for example spring 501 of FIG. 5A) may be placed in cavity 551 for example to provide tension.

While the invention herein disclosed has been described by means of specific embodiments and applications thereof, numerous modifications and variations could be made thereto by those skilled in the art without departing from the scope of the invention set forth in the claims.

What is claimed is:

1. A retractable vehicle sun shade assembly with a magnetic latch comprising:

a housing configured to extend horizontally along a bottom side of a window of a vehicle, the housing coupled to a first tension bar disposed at a first side of the housing and a second tension bar disposed at a second side of the housing opposite the first side, each of the first and second tension bars comprising a spring for biasing force in an axial direction parallel with an axis of the housing and further comprising a tip for contacting a portion of the vehicle, wherein the first and second tension bars are each disposed outside a volume of the housing;

a sun shade element having a top edge, wherein said sun shade element is configured to be rolled up in said housing when in a retracted position;

said sun shade element is configured to be extended vertically along said window when in a deployed position, wherein said top edge extends towards a top side of said window when said sun shade element is extended; and, said sun shade element is biased to said retracted position by a roll up mechanism in said housing;

one or more shade magnets disposed along said top edge;

one or more vehicle magnets configured to be mounted in a fixed orientation with respect to said window, each vehicle magnet of said one or more vehicle magnets corresponding to a shade magnet of said one or more shade magnets, wherein a magnetic attraction between said one or more vehicle magnets and said one or more shade magnets holds said sun shade element in said deployed position; and a vehicle mount, said vehicle mount comprising: a clamp configured to be detachably clamped to a rearview mirror mounting arm; a post extending vertically upward from said clamp; and a horizontal bar coupled to a top end of said post, wherein said top edge of the sun shade element is configured to be coupled to the horizontal bar when the sun shade element is extended.

2. The retractable vehicle sun shade assembly with a magnetic latch of claim 1, wherein said sun shade element has an indentation along said top edge, wherein a rearview mirror mounting arm attached to said window fits inside said indentation when said sun shade element is extended.

3. The retractable vehicle sun shade assembly with a magnetic latch of claim 1, further comprising magnets disposed on one of the sun shade element or said vehicle mount for holding said housing in a fixed position relative to said vehicle when said sun shade element is extended from said retracted position to said deployed position.

4. The retractable vehicle sun shade assembly with a magnetic latch of claim 1, wherein said one or more vehicle magnets are coupled to said vehicle mount.

5. The retractable vehicle sun shade assembly with a magnetic latch of claim 1, wherein said one or more vehicle magnets are coupled to said horizontal bar.

6. A retractable vehicle sun shade assembly with a magnetic latch comprising:
a housing configured to extend horizontally along a bottom side of a window of a vehicle;
a sun shade element having a top edge, wherein said sun shade element is configured to be rolled up in said housing when in a retracted position;
said sun shade element is configured to be extended vertically along said window when in a deployed position, wherein said top edge extends towards a top side of said window when said sun shade element is extended;
said sun shade element is biased to said retracted position by a roll up mechanism in said housing; and,
said sun shade element has an indentation along said top edge, wherein a rearview mirror mounting arm attached to said window fits inside said indentation when said sun shade element is extended;
one or more shade magnets disposed along said top edge;
one or more vehicle magnets configured to be mounted in a fixed orientation with respect to said window, each vehicle magnet of said one or more vehicle magnets corresponding to a shade magnet of said one or more shade magnets, wherein a magnetic attraction between said one or more vehicle magnets and said one or more shade magnets holds said sun shade element in said deployed position;
a left tension bar coupled to a left end of said housing, comprising a left rubber tip at a left end of said left tension bar, and biased to extend leftward from said left end of said housing to make a left contact between said vehicle and said left rubber tip;
a right tension bar coupled to a right end of said housing, comprising a right rubber tip at a right end of said right tension bar, and biased to extend rightward from said right end of said housing to make a right contact between said vehicle and said right rubber tip;
wherein said left contact and said right contact hold said housing in a fixed position relative to said vehicle when said sun shade element is extended from said retracted position to said deployed position,
at least one of the left and right tension bars comprises a pull tab, the pull tab extending perpendicularly from the respective tension bar in a direction perpendicular to the axial direction; and,
a vehicle magnet mount comprising
a clamp configured to be detachably clamped to said rearview mirror mounting arm;
a post extending vertically upward from said clamp; and,
a horizontal bar coupled to a top end of said post, wherein said one or more vehicle magnets are coupled to said horizontal bar, and said top edge of the sun shade element is configured to be coupled to the horizontal bar when the sun shade element is extended.

7. The retractable vehicle sun shade assembly with a magnetic latch of claim 1, wherein the tip of each of the first and second tension bars comprises a pointed end.

8. The retractable vehicle sun shade assembly with a magnetic latch of claim 1, wherein the sun shade element comprises a first side and a second side, the first side is distinct from the second side.

9. The retractable vehicle sun shade assembly with a magnetic latch of claim 8, wherein the first side is configured to absorb heat from the sun, and the second side is configured to reflect heat from the sun; wherein the sun shade element is reversible for use during winter and summer, respectively.

10. The retractable vehicle sun shade assembly with a magnetic latch of claim 1, wherein at least one of the first and second tension bars comprises a pull tab, the pull tab extending perpendicularly from the respective tension bar in a direction perpendicular to the axial direction.

11. The retractable vehicle sun shade assembly with a magnetic latch of claim 2, wherein the indentation comprises a u-shaped indentation.

12. The retractable vehicle sun shade assembly with a magnetic latch of claim 11, wherein a first magnet is disposed along the top edge of the sun shade element at a first side relative to the u-shaped indentation, and a second magnet is disposed along the top edge of the sun shade element at a second side relative to the u-shaped indentation opposite the first side.

* * * * *